(12) United States Patent
Glasow et al.

(10) Patent No.: US 9,216,466 B2
(45) Date of Patent: Dec. 22, 2015

(54) GEAR PROCESSING MACHINE

(71) Applicant: THE GLEASON WORKS, Rochester, NY (US)

(72) Inventors: Kenneth E. Glasow, Spencerport, NY (US); William D. McGlasson, Caledonia, NY (US)

(73) Assignee: THE GLEASON WORKS, Rochester, NY (US)

( * ) Notice: Subject to any disclaimer, the term of this patent is extended or adjusted under 35 U.S.C. 154(b) by 612 days.

(21) Appl. No.: 13/711,678

(22) Filed: Dec. 12, 2012

(65) Prior Publication Data

US 2013/0149061 A1  Jun. 13, 2013

Related U.S. Application Data

(60) Provisional application No. 61/569,836, filed on Dec. 13, 2011.

(51) Int. Cl.
*B23F 9/10* (2006.01)
*B23F 17/00* (2006.01)
(Continued)

(52) U.S. Cl.
CPC . *B23F 17/00* (2013.01); *B23F 9/10* (2013.01); *B23F 9/105* (2013.01); *B23Q 1/4804* (2013.01); *B23Q 1/5468* (2013.01); *B23Q 1/5475* (2013.01); *B23Q 1/5487* (2013.01); *B23Q 7/03* (2013.01); *B23Q 11/0053* (2013.01);
(Continued)

(58) Field of Classification Search
CPC ........... Y10T 409/307672; Y10T 409/308288; Y10T 409/308512; Y10T 409/305656; Y10T 409/305712; Y10T 409/305768; Y10T 409/305824; Y10T 409/104611; Y10T 409/103816; Y10T 409/103975; Y10T 409/106042; Y10T 409/108268; B23F 9/10; B23F 9/105; B23F 9/14; B23F 23/02; B23F 23/04
See application file for complete search history.

(56) References Cited

U.S. PATENT DOCUMENTS 2,932,923 A * 4/1960 Carlsen ................... B23F 9/025
409/30
3,464,312 A * 9/1969 Hanzawa .................. B23F 9/10
409/29
(Continued)

FOREIGN PATENT DOCUMENTS

DE 2359249 A1 * 8/1974 ................ B23F 9/10
DE 3643967 A1 * 7/1987 .............. B23F 9/105
(Continued)

OTHER PUBLICATIONS

International Search Report and Written Opinion for PCT/US2012/069095.

*Primary Examiner* — Daniel Howell
*Assistant Examiner* — Yasir Diab
(74) *Attorney, Agent, or Firm* — Robert L. McDowell

(57) ABSTRACT

A machine tool comprising a machine base having a first side comprising a first planar surface and a machine column movable along an arcuate path on the first planar surface. The machine further comprises a first spindle movable in a first linear direction and being rotatable about a first axis of rotation. The machine further comprises a machine turret located on a second planar surface of the machine base first side. The machine turret is angularly movable about a pivot axis. The machine turret includes a second spindle positioned within the turret with the second spindle being rotatable about a second axis of rotation and being movable in a second linear direction.

24 Claims, 17 Drawing Sheets

(51) Int. Cl.
  *B23Q 1/48*   (2006.01)
  *B23Q 1/54*   (2006.01)
  *B23Q 7/03*   (2006.01)
  *B23Q 11/00*   (2006.01)
  *B23Q 11/08*   (2006.01)
  *B23F 23/02*   (2006.01)
  *B23F 9/14*   (2006.01)

(52) U.S. Cl.
  CPC ........ *B23Q11/0057* (2013.01); *B23Q 11/0833* (2013.01); *B23F 9/14* (2013.01); *B23F 23/02* (2013.01); *B23Q 2210/006* (2013.01); *Y10T 409/103975* (2015.01); *Y10T 409/104611* (2015.01); *Y10T 409/105883* (2015.01); *Y10T 409/305656* (2015.01); *Y10T 409/305712* (2015.01); *Y10T 409/305768* (2015.01)

(56) References Cited

U.S. PATENT DOCUMENTS

| | | | |
|---|---|---|---|
| 4,589,174 A | 5/1986 | Allen | |
| 4,930,950 A * | 6/1990 | Stadtfeld | B23F 23/125 409/2 |
| 4,981,402 A | 1/1991 | Krenzer et al. | |
| 5,310,295 A * | 5/1994 | Palmateer, Jr. | B23F 9/10 409/13 |
| 5,800,103 A * | 9/1998 | Stadtfeld | B23F 9/025 409/26 |
| 5,961,260 A | 10/1999 | Kaesler et al. | |
| 6,669,415 B2 * | 12/2003 | Stadtfeld | B23F 9/025 409/26 |
| 6,712,566 B2 | 3/2004 | Stadtfeld et al. | |
| 6,752,573 B2 * | 6/2004 | Haller | B23Q 1/012 409/134 |
| 7,179,025 B2 * | 2/2007 | Kreh | B23F 9/00 409/26 |
| 7,927,048 B2 | 4/2011 | Gumpl et al. | |
| 2006/0002775 A1 | 1/2006 | Fong et al. | |
| 2006/0269375 A1 * | 11/2006 | Takayama | B23Q 11/0816 409/134 |
| 2007/0048098 A1 | 3/2007 | Bone et al. | |
| 2008/0131224 A1 * | 6/2008 | Vouillamoz | B23G 1/34 409/74 |

FOREIGN PATENT DOCUMENTS

| | | |
|---|---|---|
| DE | 10348442 A1 | 6/2005 |
| JP | 2006239813 A * | 9/2006 |

* cited by examiner ical generating gear and the cradle axis corresponds to
GEAR PROCESSING MACHINE This application claims the benefit of U.S. Provisional Patent Application No. 61/569,836 filed Dec. 13, 2011 the entire disclosure of which is hereby incorporated by reference.

FIELD OF THE INVENTION

The invention is directed to machine tools and in particular to machines for processing gears such as bevel and hypoid gears.

BACKGROUND OF THE INVENTION

Conventional mechanical gear generating machines for producing bevel and hypoid gears by generating or non-generating processes comprise a work support mechanism and a cradle mechanism. During a generating process, the cradle carries a circular tool along a circular path about an axis known as the cradle axis. The cradle represents the body of a theoretical generating gear and the cradle axis corresponds to the axis of the theoretical generating gear. The tool represents one or more teeth on the generating gear. The work support orients a workpiece relative to the cradle and rotates it at a specified ratio to the cradle rotation. Traditionally, conventional mechanical cradle-style bevel gear generating machines are usually equipped with a series of linear and angular scales (i.e. settings), which assist the operator in accurately locating the various machine components in their proper positions, which may include an adjustable mechanism that enables tilting of the tool spindle axis relative to the cradle axis.

More recently, gear producing machines have been developed which reduce the number of machine settings necessary to orient a tool relative to a workpiece. These machines replace some or all of the settings and movements of the conventional mechanical cradle-style machine with a system of linear, rotational, and/or pivoting (angular) axes. Typically, such machines are computer controlled multi-axis machines comprising at least six controlled axes for rotating a tool and a workpiece as well as positioning the tool and workpiece relative to one another for machining. Usually, three linear axes (usually mutually perpendicular) and three rotational and/or angular (i.e. pivot) axes are present on the multi-axis machines. Examples of such machines may be found in U.S. Pat. Nos. 4,981,402; 6,712,566; 5,961,260; 7,927,048 and U.S. Patent Application Publication No. 2006/0002775. Similar machine construction is also known for the so-called "machining centers" as shown, for example, in U.S. Pat. No. 6,752,573.

In some machines of the prior art, one or more linear axes have required travels beyond what is necessary for only the machining process. This "extra" axis travel is needed to obtain the necessary clearance for loading and/or unloading operations (manual or automated) and may necessitate the use of longer rails (guide ways) or the inclusion of machine components having large overhangs. The need for longer rails adds to the cost of machine manufacture and may increase the overall size (i.e. the "footprint") of the machine. Component overhangs may threaten machine static or dynamic stiffness.

In other prior art machines, the manner of angular (pivoting) movement of one component may be cumbersome as it involves a pivoting mechanism located in the machining chamber where it may be exposed to machining by-products such as process fluids, metal chips and/or grinding swarf. In other machines, the angular movement of a component may require long axis rails and/or linear axis travel of large distances for other machine components in order to maintain proper workpiece/tool positioning. As stated above, the need for longer rails and their actuators (i.e. ball screws, feedback devices, etc.) adds to the cost of machine manufacture and may increase the overall size ("footprint") of the machine. Additionally, long travel distances may result in additional cycle time to process a workpiece.

SUMMARY OF THE INVENTION

The invention is directed to a machine tool comprising a machine base having a first side and a machine column movable along an arcuate path on the first side about a first pivot axis. The machine further comprises a first spindle movable in a first linear direction and being rotatable about a first axis of rotation. The machine further comprises a machine turret located on the machine base first side. The machine turret is angularly movable about a second pivot axis. The machine turret includes a second spindle positioned within the turret with the second spindle being rotatable about a second axis of rotation and being movable in a second linear direction.

DETAILED DESCRIPTION OF THE PREFERRED EMBODIMENT

Figure 1:
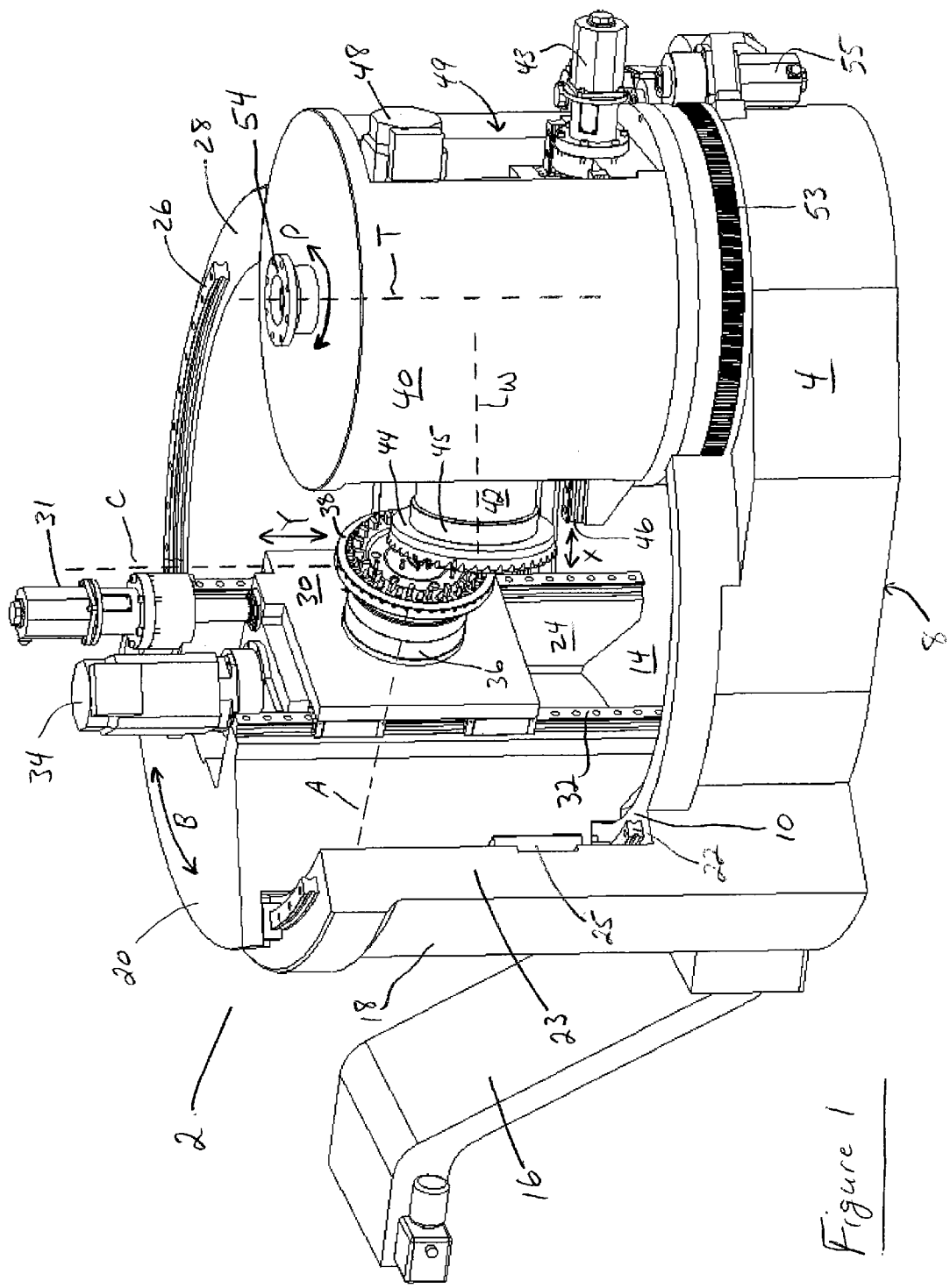
FIG. 1 illustrates a perspective view of a machine according to a first embodiment of the invention arranged for cutting a ring gear.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding have been omitted from the drawings.

In the context of the invention, the term "bevel" gears is understood to be of sufficient scope to include those types of gears known as bevel gears, "hypoid" gears, as well as those gears known as "crown" or "face" gears.

Figure 2:
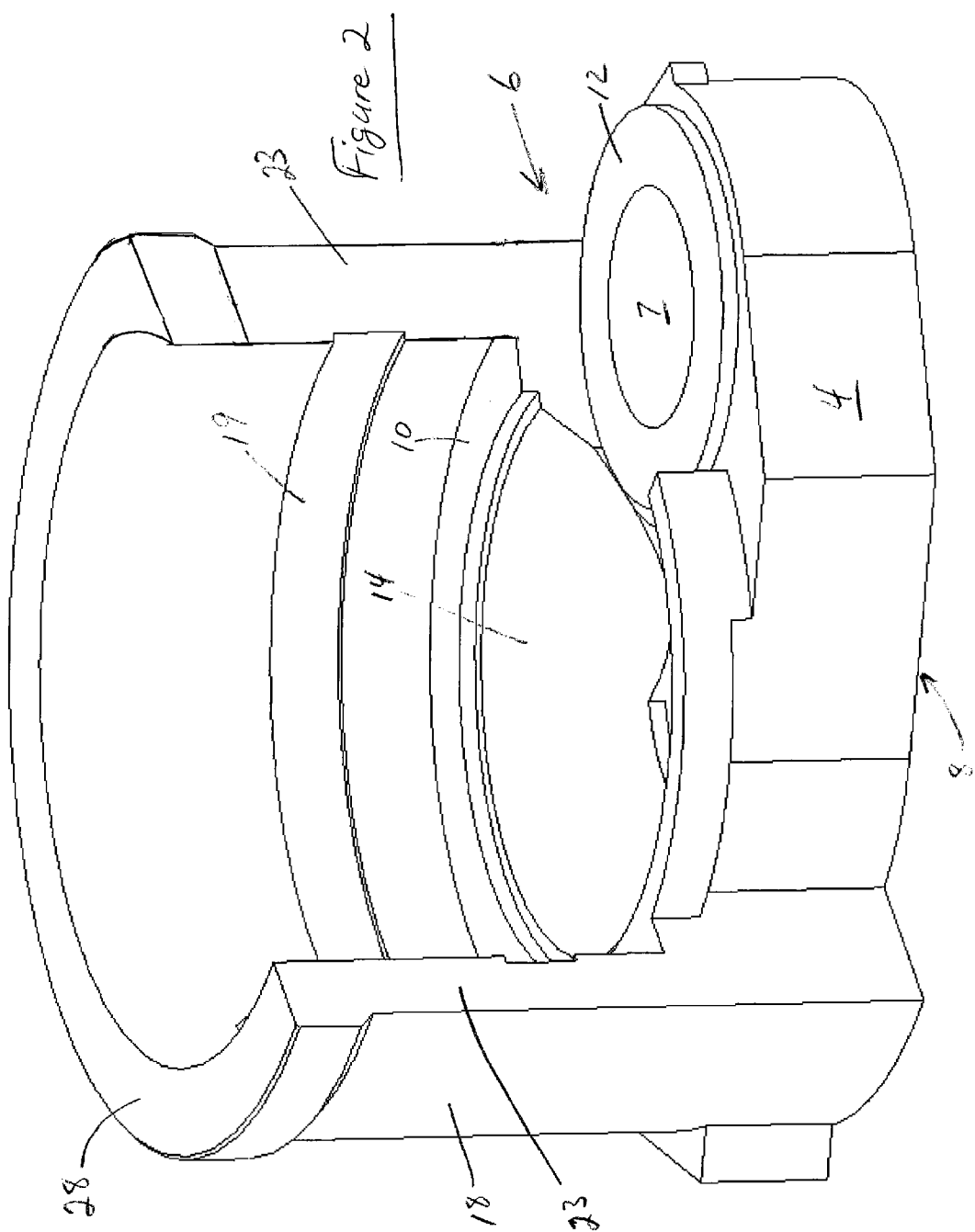
FIG. 2 is a perspective view of the frame of the inventive machine.
Figure 3:
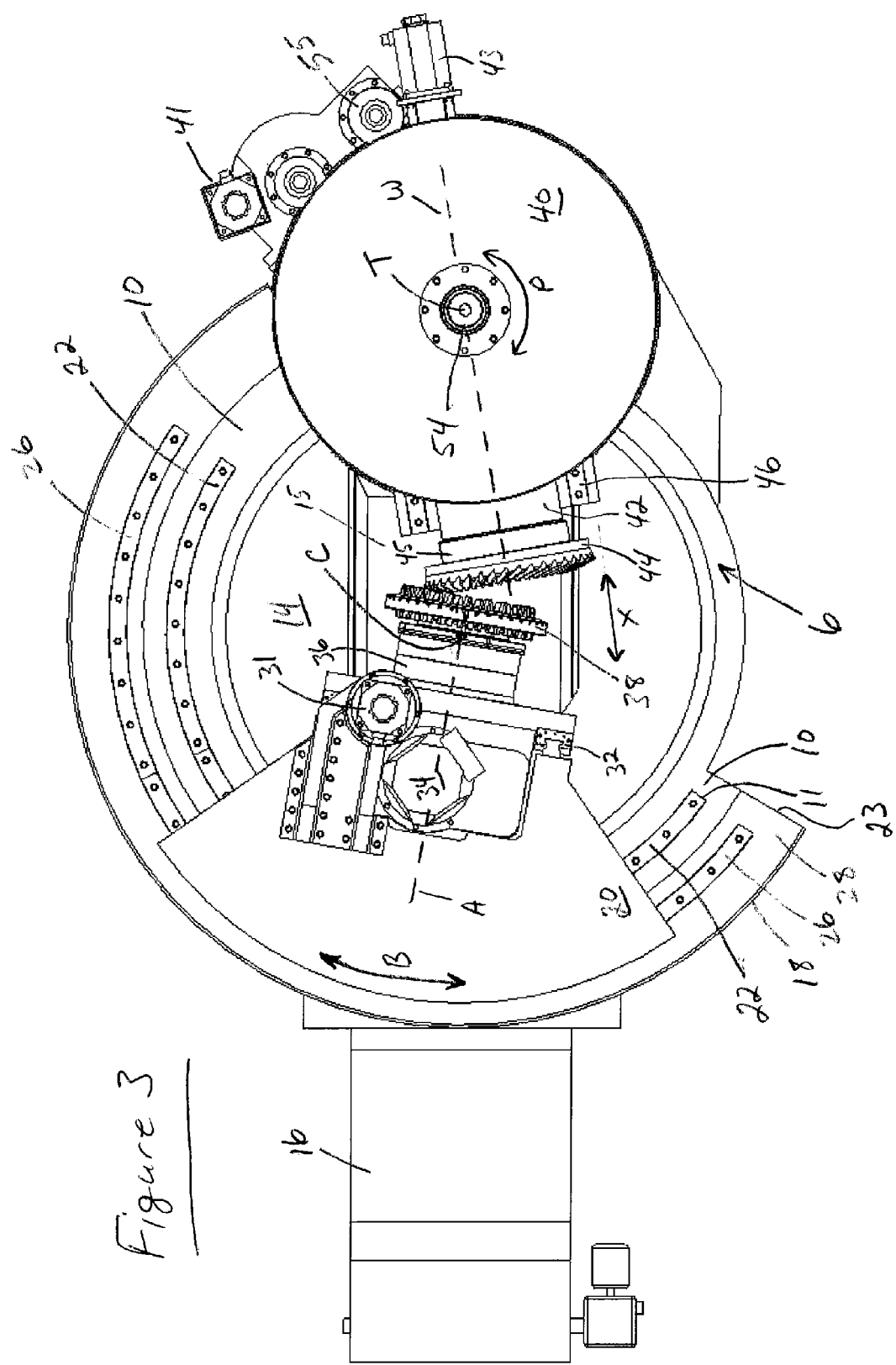
FIG. 3 is a top view of the machine of FIG. 1.

FIGS. 1-3 show a machine 2 according to a first embodiment of the invention. The machine comprises a base portion 4 having a first side 6 and a second side 8 (FIG. 2). First side 6 includes a planar surface 10 and another planar surface 12. In the orientation shown in FIG. 1, planar surfaces 10 and 12 are parallel to one another and are, most preferably, horizontal. Planar surfaces 10, 12 may be co-planar within the same horizontal plane. The base 4 is preferably made of a cast mineral aggregate but may also be made of other material such as cast iron or assembled steel or iron elements. A tapered or cone-shaped trough 14 in first side 6 directs the by-products of machining (e.g. process fluids, cutting chips, grinding swarf, lapping compound, etc.) through an opening 15 in the base 4 where it is carried out of the machine via a suitable mechanism such as, for example, a chip removal device 16. The particular removal device 16 does not form part of the invention.

Extending away from the first side 6 (vertically in the orientation shown in FIG. 1) is a columnar wall portion 18 of a generally curved shape, preferably circular arc-shaped, extending about a portion of the base 4 and having end faces 23. Preferably, wall portion 18 extends generally perpendicular with respect to planar surfaces 10, 12. Wall portion 18 may be formed integral with the base 4 such as by casting base 4 and wall portion 18 as a single unit or wall portion 18 may be attached to base 4 by any suitable means such as bolts, adhesive, welding, etc. Together, base 4 and wall portion 18 form the machine frame. The column-like structure of the frame itself forms much of the outside covering of the machine, reducing the cost of external guard structures and covers. The machine frame takes advantage of the inherent strength found in bending and twisting of cylindrical beam cross sections. By conducting the machine process inside the column-like element of the frame (instead of outside the column of some prior-art machines), a higher utilization of the frame material is created (more column strength with less weight). The essentially cylindrical column-like structure of wall portion 18 provides more effective utilization of the damping properties of frame material than found in a block column.

Machine 2 includes a machine column 20 movable and positionable in a direction B along an arc-shaped path on first side 6, preferably on planar surface 10, via arc-shaped guide ways such as bearing rails 22. Alternatively, box-type rails or hydrostatic rails may be utilized. The center of the arcuate B motion, pivot axis C (FIG. 3), is preferably located at the geometric center of the arcuate wall portion 18. Column 20 is preferably made of cast iron but may also be made of other material such as cast mineral aggregate. A first end 24 of column 20 may be shaped to generally conform to the tapered trough 14 in base 4. Another guide way such as bearing rail 26, located on an end surface 28 of wall 18, may be provided for assisting the arcuate movement and positioning of column 20.

Figure 7:
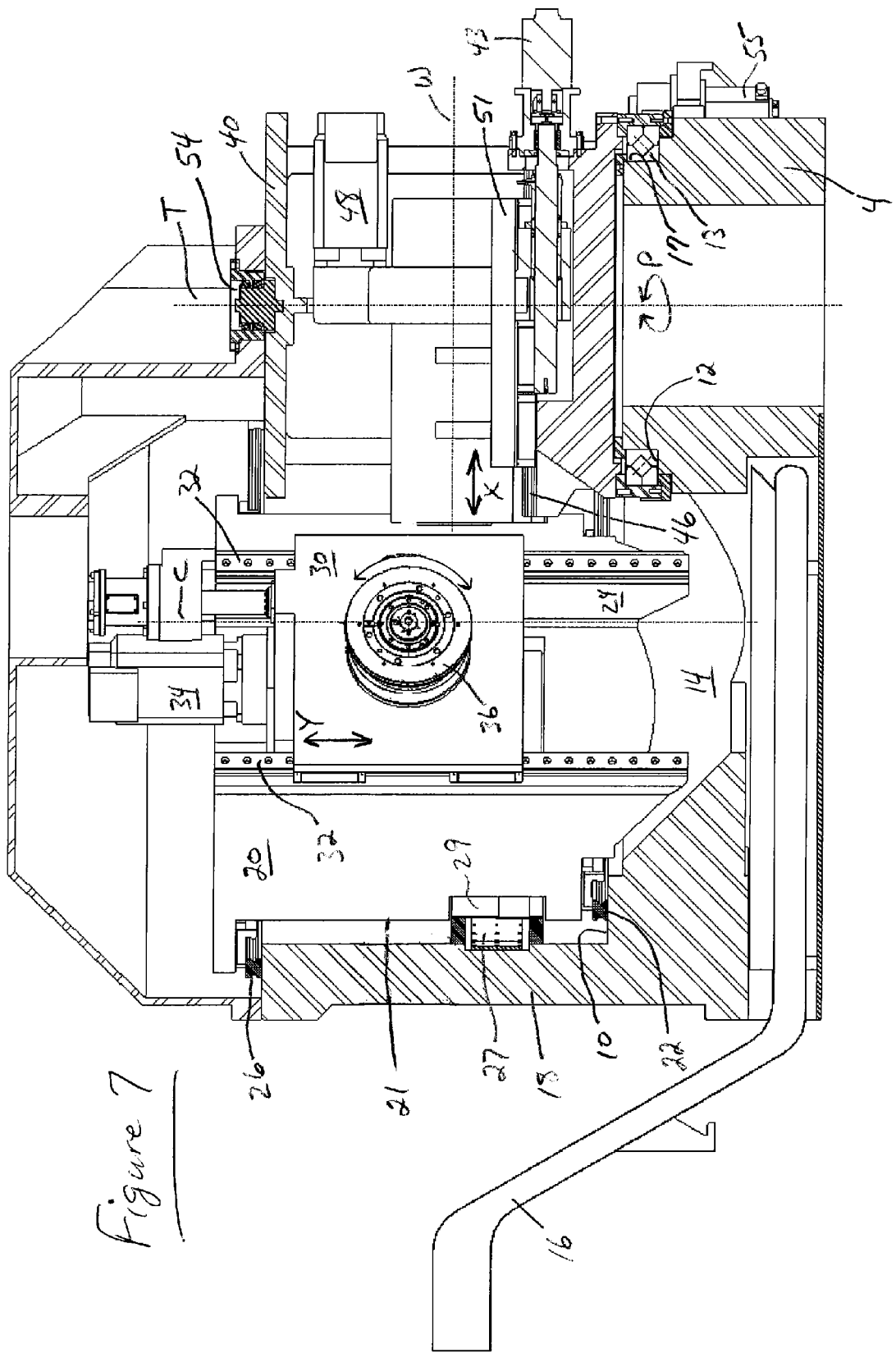
FIG. 7 illustrates a machine cross-sectional view facing the tool spindle.

Column 20 is preferably movable and positionable in direction B by a direct drive segmented motor 25 having magnet plates 27 located in channel 19 of wall 18 and a motor coil 29 located on the opposing outer surface 21 of column 20 (see FIG. 7). In an opposite manner, magnetic plates 27 may be located on the opposing outer surface 21 of column 20 and a motor coil 29 may be located in channel 19 of wall 18. Alternatively, column 20 may be moved and positioned via a friction drive, belt drive, ballscrew or other suitable means. Bearing rails 22 and 26 may be suitably covered (not shown) to prevent contamination by machining by-products such as those mentioned above. Column 20 is constructed inside the machine frame such that it is equally well supported at any position, rather than tending to increase its overhang in certain positions.

A carriage 30 is located on column 20 and is movable along column 20 via a set of guide ways, such as bearing rails 32, and a motor 31 such as a servo motor. Alternatively, box-type rails or hydrostatic rails may be utilized. Carriage 30 is movable in a direction Y parallel to axis C and perpendicular to the planar surface 10 (vertically in the orientation of FIG. 1). Located in carriage 30 is a first spindle 36, for example a tool spindle, rotatable about a first axis of rotation A for rotation of a tool 38 removably secured to spindle 36. For illustration purposes, a cutting tool is shown in FIG. 1 however the tool 38 could also be a grinding wheel, for example. The rotation of spindle 36 is preferably by gear drive via motor 34 but the spindle may be rotated via other means such as by direct drive or belt drive. Bearing rails 32 may be suitably covered (not shown) to prevent contamination by machining by-products such as those mentioned above. Axis A is preferably perpendicular to direction Y and axis C.

Figure 15:
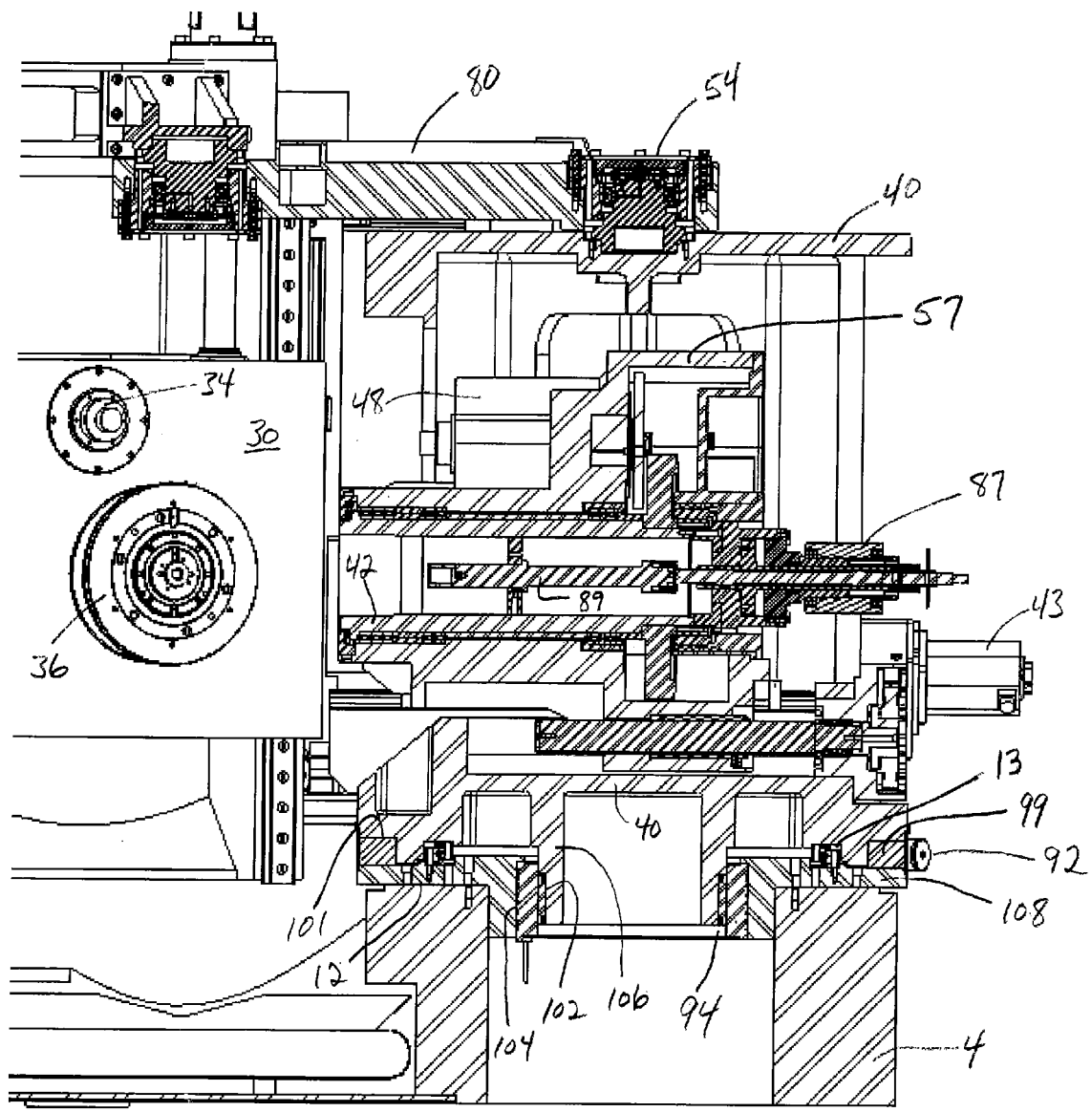
FIG. 15 is a cross-sectional view of the turret of FIG. 11.

Machine 2 further includes a turret 40 angularly movable on first side 6, preferably on planar surface 12, in direction P about an axis T which is preferably parallel to axis C and which preferably extends perpendicular to planar surfaces 10 and 12. Turret 40 preferably includes opposed openings 47 and 49 which can be closed via suitable doors and/or guarding (not shown). Turret 40 may be gear driven by an external motor 41 engaged with a turret gear 53 although alternatively, a motor located within an opening 7 in base 4 (FIG. 2) may be utilized. An anti-backlash motor 55 is preferably included along with turret motor 41 to enhance the rotational, pivotal and positionable accuracy of turret 40. Located within turret 40 is a second spindle 42, for example a workpiece spindle, positioned in a spindle housing 57 and rotatable about a second axis of rotation W, for rotation of a workpiece 44 removably secured to spindle 42 via suitable workholding equipment 45 (as would be understood by the artisan) operable by, for example, a hydraulic actuator 87 and draw rod 89 (FIG. 15). The rotation of spindle 42 is preferably by gear drive via motor 48 but the spindle may be rotated via other means such as by direct drive or belt drive. For illustration purposes, a ring gear is shown in FIG. 1. Preferably, the second axis of rotation W is perpendicular to the turret axis T.

Spindle 42 and housing 57 are preferably positioned on a carriage 51 and is linearly movable and positionable in a direction X via a set of guide ways, such as bearing rails 46, and is driven by a motor 43, for example a servo motor. Alternatively, box-type rails or hydrostatic rails may be utilized. It can be appreciated that instead of a carriage 51, spindle 42 may reside within a quill mechanism (not shown).

Preferably, the X direction of movement is perpendicular to the turret axis T. It is also preferred that the X direction of movement and the second axis of rotation, W, are parallel to one another and, most preferably, that the X direction of movement and the second axis of rotation W are both perpendicular to the turret axis T. Bearing rails 46 may be suitably covered (not shown) to prevent contamination by machining by-products such as those mentioned above. Additionally, turret openings 47, 49 also include means such as doors, covers, etc. to prevent entry of machining by-products into the interior of the turret 40. The rotary motion of the turret 40 may be guarded by stationary linear wipers proximal to the outside cylindrical shape of the turret. No collapsing or accordion covers are required as is the case with many linear axes of the prior art.

With machine 2, the linear directions of motion (X, Y) do not require significant linear travels in excess of what is needed to support the basic processes. The travel of the turret 40 about axis T provides the needed load/unload clearance. This reduces the overhangs resulting from accommodating additional linear axes travel. In particular, both the overhang and total travel in the X direction (workpiece moving linearly in the direction of its own spindle axis of rotation) are significantly smaller than in prior-art machines of comparable capacity. Also, X direction positioning for some large gears (having the heaviest cutting forces) tends to be closer to the turret 40 thereby resulting in less overhang with respect to the turret support bearing.

Movement of carriage 30 in direction Y, second spindle 42 in direction X, arcuate motion B of column 20 about axis C, angular motion P of turret 40 about axis T, as well as rotation of first spindle 36 about axis A and rotation of second spindle 42 about axis W, is imparted by separate respective drive motors 31, 43, 25, 41, 34, and 48. The above-named components are capable of independent movement with respect to one another or may move simultaneously with one another. Each of the drive motors is preferably associated with a feedback device such as a linear or rotary encoder as part of a CNC system which governs the operation of the drive motors in accordance with instructions input to a computer controller (i.e. CNC) such as the Fanuc 30i series or Siemens 840D series (not shown).

The relationship between the theoretical generating gear in mesh with a workpiece is preferably maintained in the present invention by angular movement (B, P) between the tool and workpiece axes in combination with relative rectilinear movements between the tool and workpiece along one or both of the two linear directions of motion (X, Y) and rotational movement of the workpiece about its axis (W). In the case of continuous indexing, rotational movement of the tool axis (A) is also controlled. It has generally become the practice in the art to utilize the same input parameters as a conventional mechanical cradle-style gear generating machine for other machines having a different number and/or configuration of axes. The positions of the tool and workpiece as defined in the coordinate system of a conventional mechanical cradle-style bevel gear generating machine may be transformed into the coordinate system of the inventive machine using approaches similar to those described in U.S. Pat. No. 4,981,402 or 6,712,566, the disclosures of which are hereby incorporated by reference. Alternatively, the positions of the tool and workpiece as defined in the coordinate system of a multi-axis machine (for example, U.S. Pat. No. 4,981,402 or 6,712,566) may be transformed into the coordinate system of the inventive machine as can be appreciated by the skilled artisan.

Preferably, wall portion 18 generally extends from about the first end 11 of arcuate guide way 22 and along the length of arcuate guide ways 22 to the turret 40 (clockwise in FIG. 3). The portion of the machine from about first end 11 counter-clockwise to the turret 40 is preferably closable via one or more door mechanisms. If desired, a cover 50 (FIG. 4) may be included. Cover 50 is preferably attached to wall portion 18 at end surface 28 via suitable means such as bolts, screws, etc. Cover 50 may include a cut-out portion 52 to allow access to the interior portion of the machine by a means such as, for example, a crane for loading and unloading of tools. Cut-out portion 52 may further include suitable means for closing such as a one or more retractable doors or an accordion style type of closure. Cover 50 may further accommodate an additional bearing mechanism 54 for providing additional rotation stiffness and support of turret 40.

Figure 5:
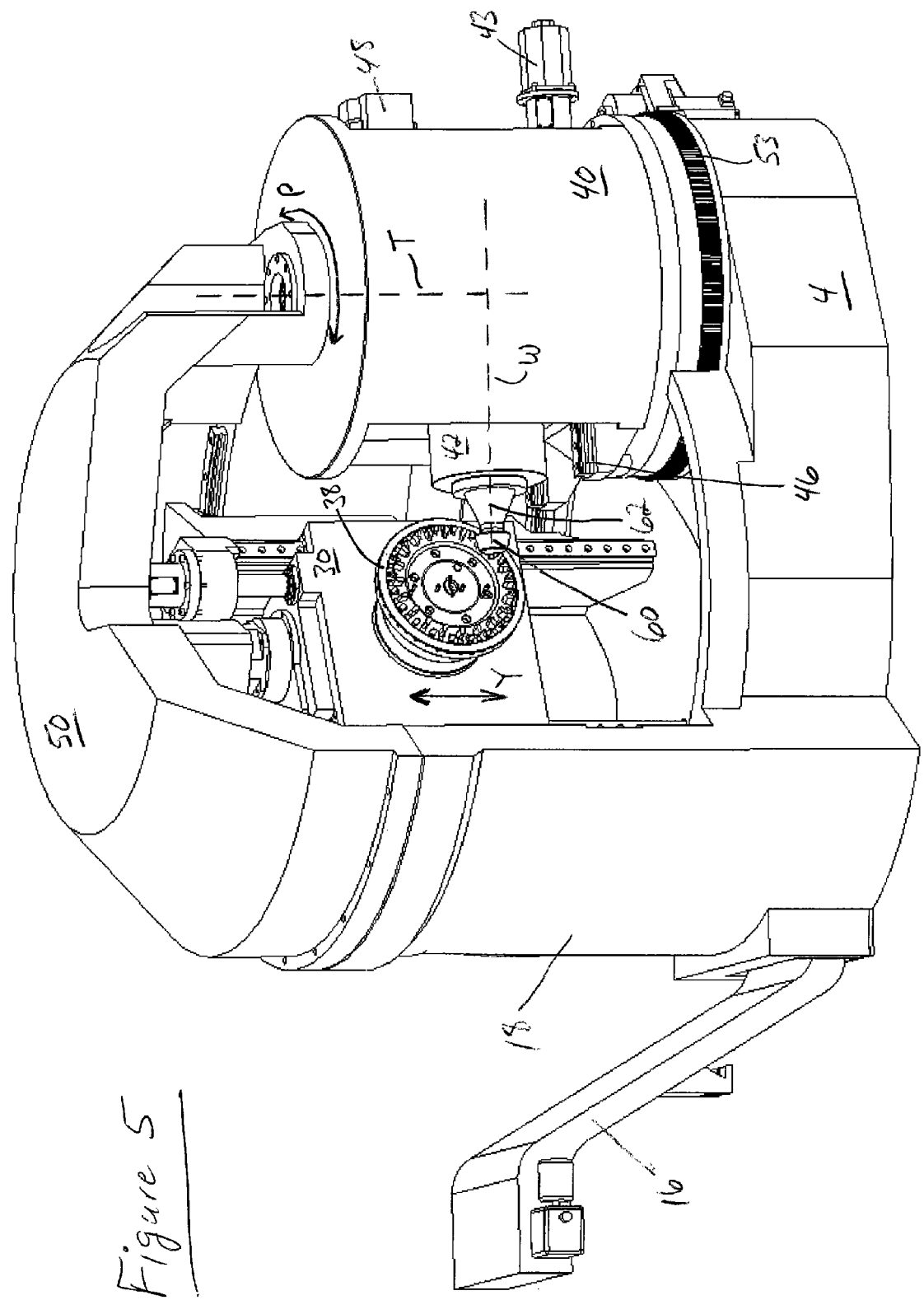
FIG. 5 shows the inventive machine arranged for cutting a pinion.
Figure 6:
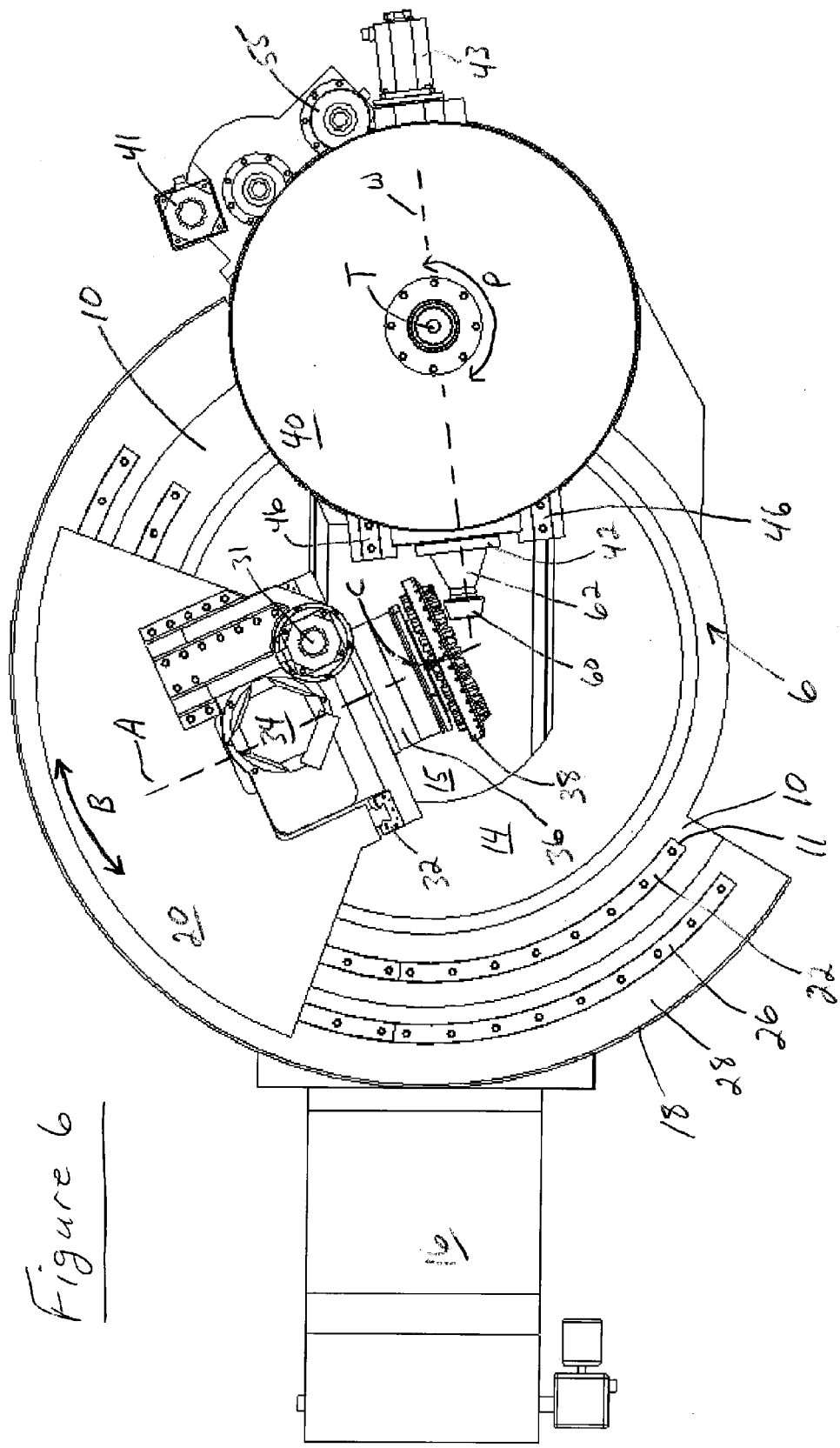
FIG. 6 shows a top view of the machine of FIG. 5 with the cover removed.

FIGS. 5 and 6 correspond to FIGS. 1 and 3 respectively except that a pinion 60 is shown removably secured to spindle 42 via suitable workholding equipment 62 as would be understood by the artisan. The illustrated tool 38 is a cutting tool although it should be understood that other tools, such as a grinding wheel, may be utilized depending upon the particular machining process.

Figure 8:
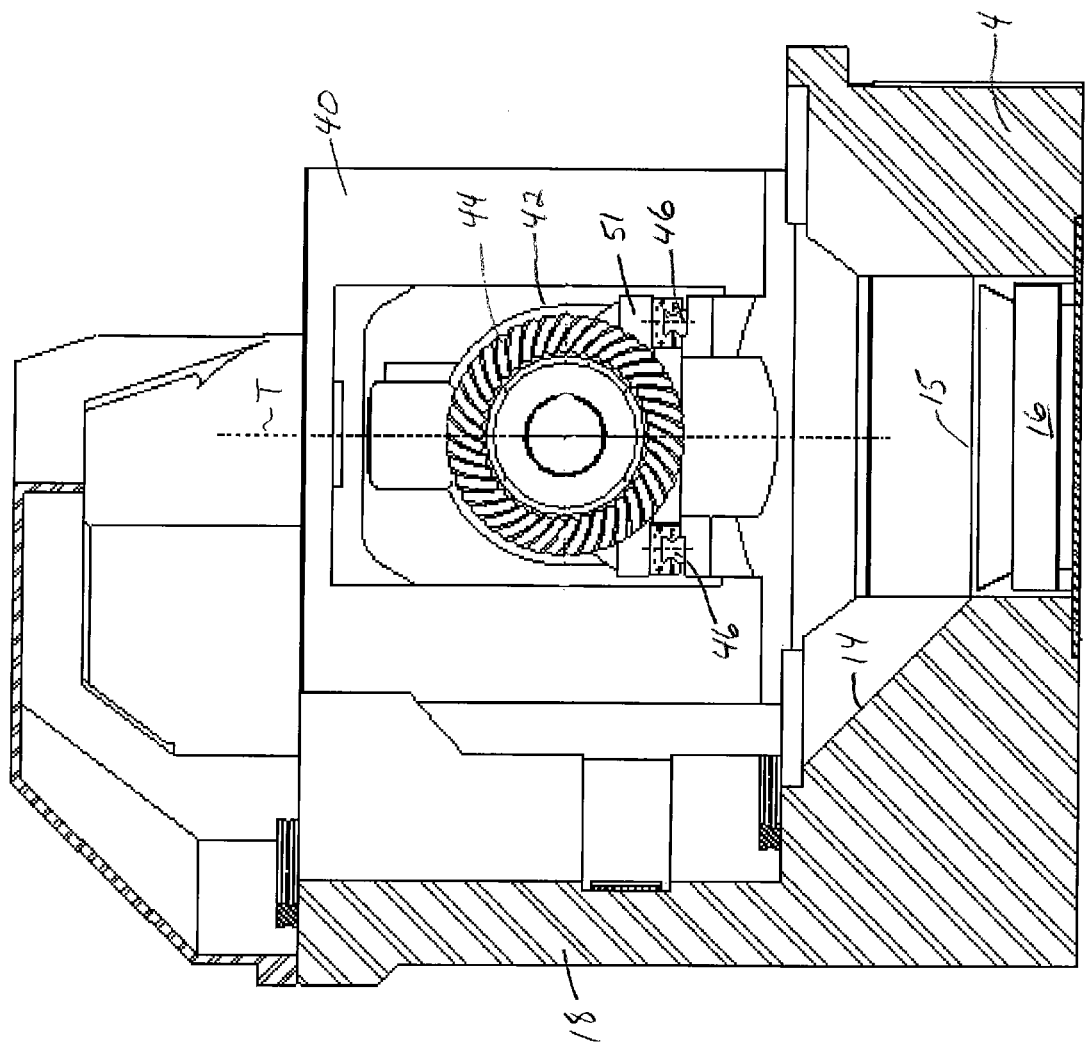
FIG. 8 illustrates a machine cross-sectional view facing the workpiece spindle.

FIG. 7 shows a sectional view of the machine 2 with a view generally toward the carriage 30 and spindle 36. It can also be seen that turret 40 is rotatably positioned on second planar surface 12 via turret bearing 13. A portion of base 4 located radially inward of bearing 13 is preferably extended axially to create a journal 17 for additional bearing support. FIG. 8 shows a sectional view of machine 2 with a view toward a workpiece 44 positioned on spindle 42 located within turret 40.

Figure 9:
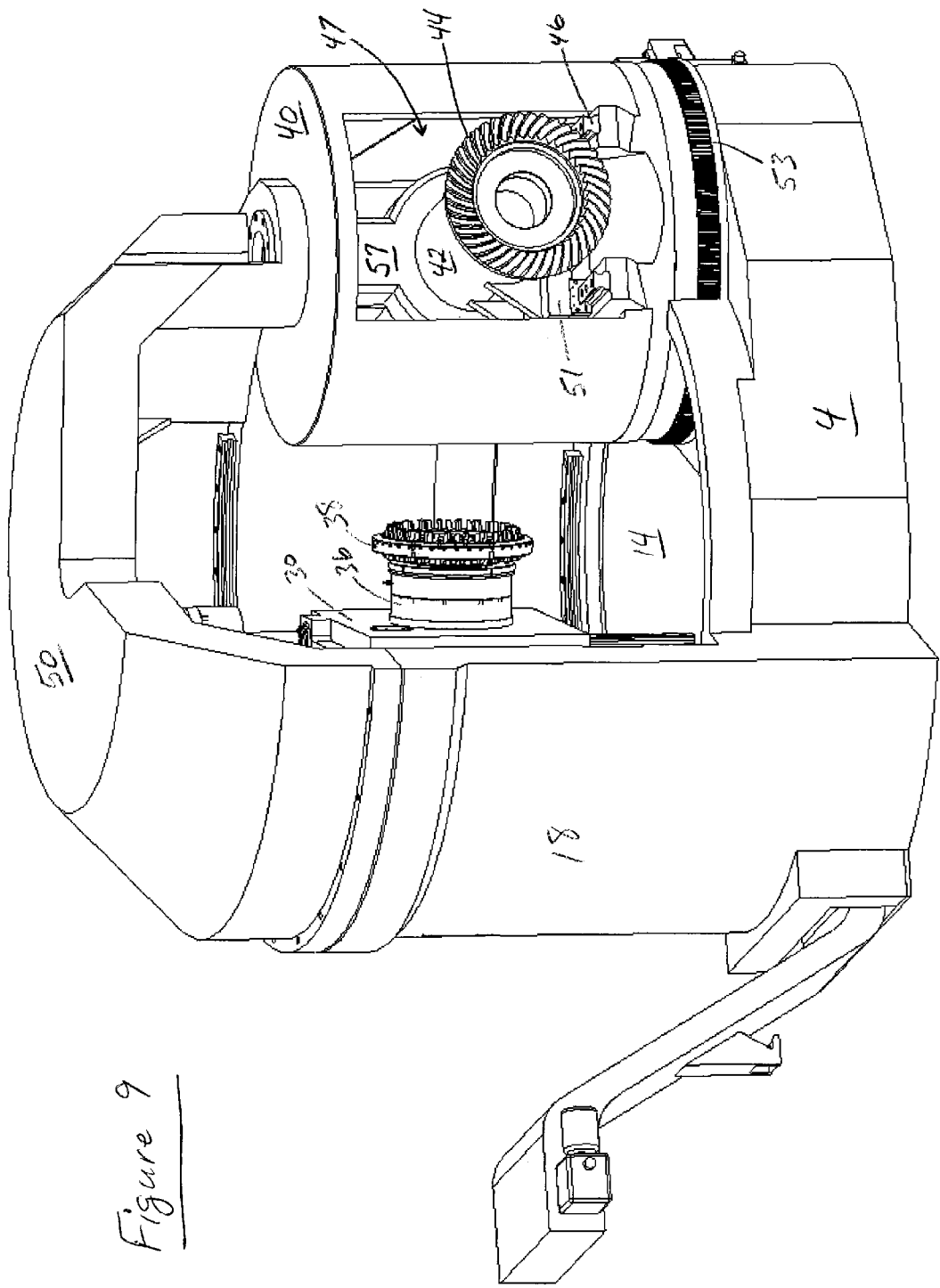
FIG. 9 shows the machine turret rotatably positioned to present a workpiece at an exterior location of the machine.

FIG. 9 illustrates an example of the ability of turret 40 to be rotated and positioned in direction P about turret axis T. Turret 40 is shown rotated from a machining position facing the machine work chamber (as in FIG. 3) to a position facing outward and away from machine 2. Preferably, the direction of turret rotation is counter-clockwise as this direction involves the least amount of travel but this is not mandatory. In such a position, for example, loading and/or unloading of workpieces may be carried out, workholding equipment may be changed or serviced, spindle 42 or other mechanisms within turret 40 may be maintained.

Figure 10:
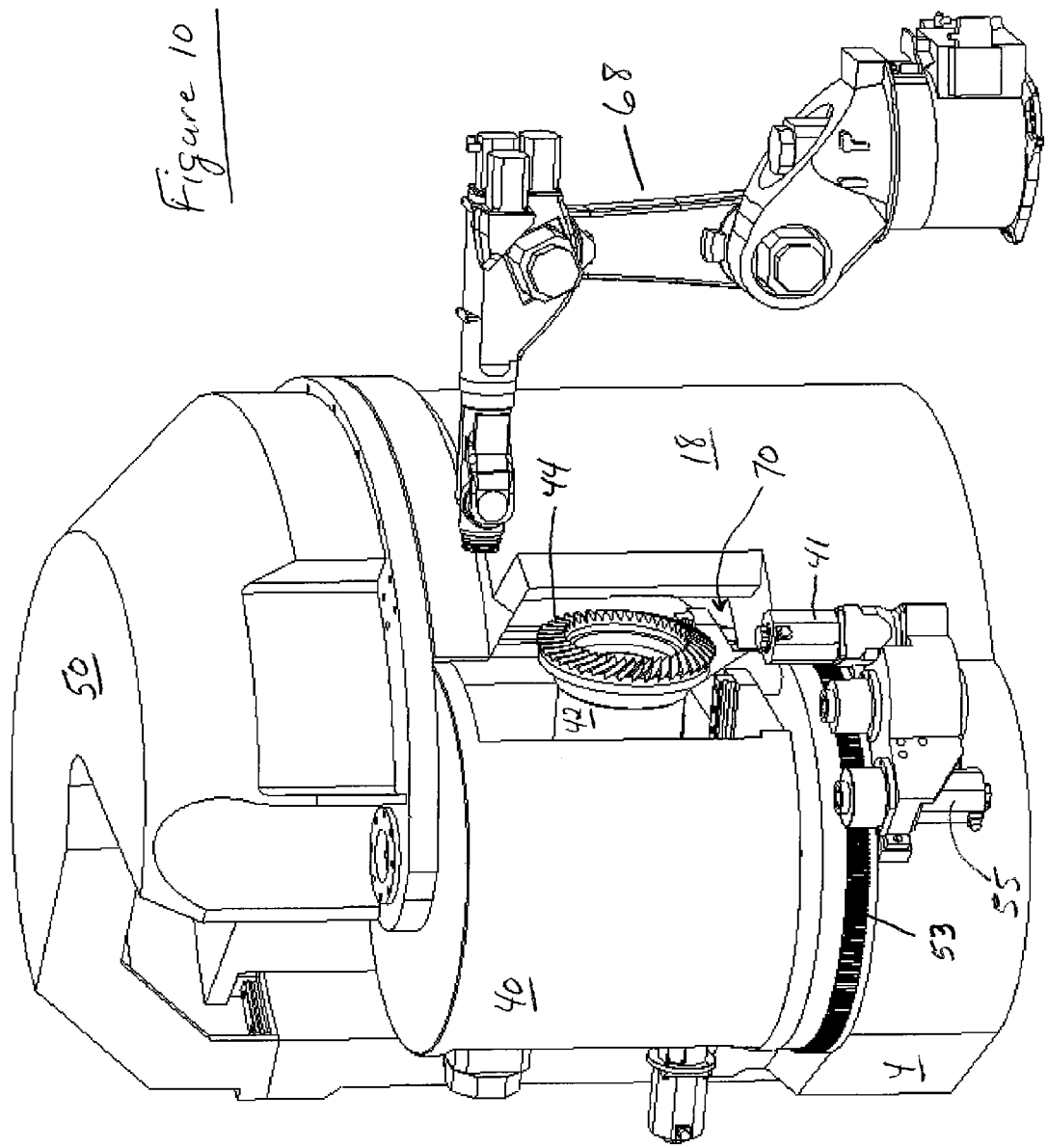
FIG. 10 shows the machine turret rotatably positioned to present a workpiece to a robotic loader at an exterior location of the machine.

FIG. 10 illustrates another example of turret positioning wherein a robot 68 for loading and unloading workpieces 44 is located outside the machine 2 near the wall portion 18. In this instance, the shortest amount of travel for the turret 40 from the working position in the machine chamber (FIG. 3) is a clockwise rotation of the turret to the location of the robot 68. To facilitate this rotation, a closable opening 70 in the wall portion 18 may be included to provide clearance for the workpiece to pass in the event the workpiece is too large to be completely withdrawn into the turret. It can be appreciated that automation equipment, such as a workpiece loading apparatus, does not need to reach inside of the machine chamber in order to serve the workpiece spindle 42. Furthermore, with loading/unloading of workpieces occurring at a location such as shown by FIG. 10, there is no interference with the position normally occupied by the machine operator which generally is near the "front" or "open" area of the machine (i.e. the portion of the machine from about first end 11 of arcuate guide way 22 counter-clockwise to the turret 40). It can also be seen that loading and unloading of workpieces could occur at respective separate turret positions.

Figure 11:
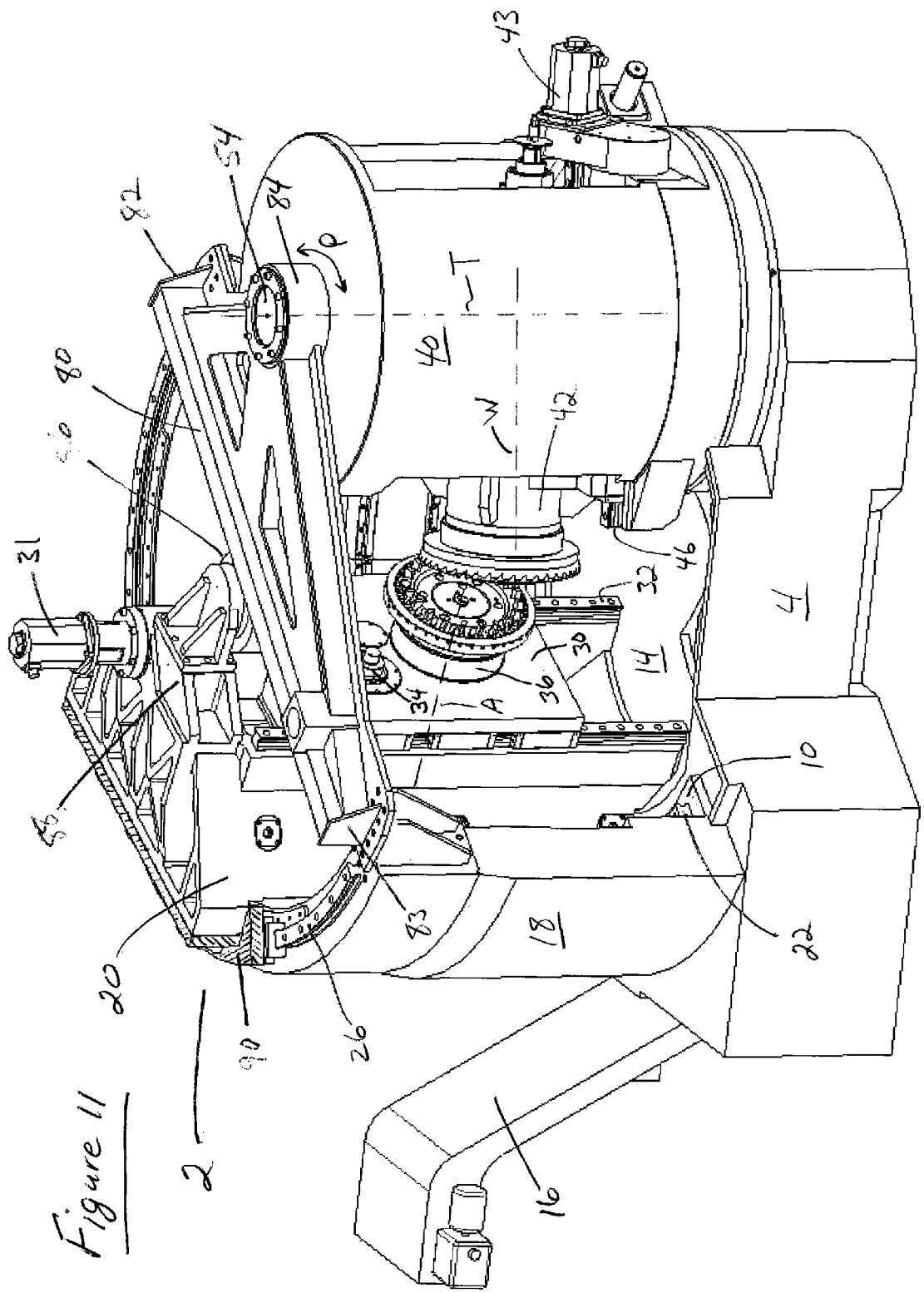
FIG. 11 illustrates a perspective view of a machine according to another embodiment of the invention arranged for cutting a ring gear.
Figure 12:
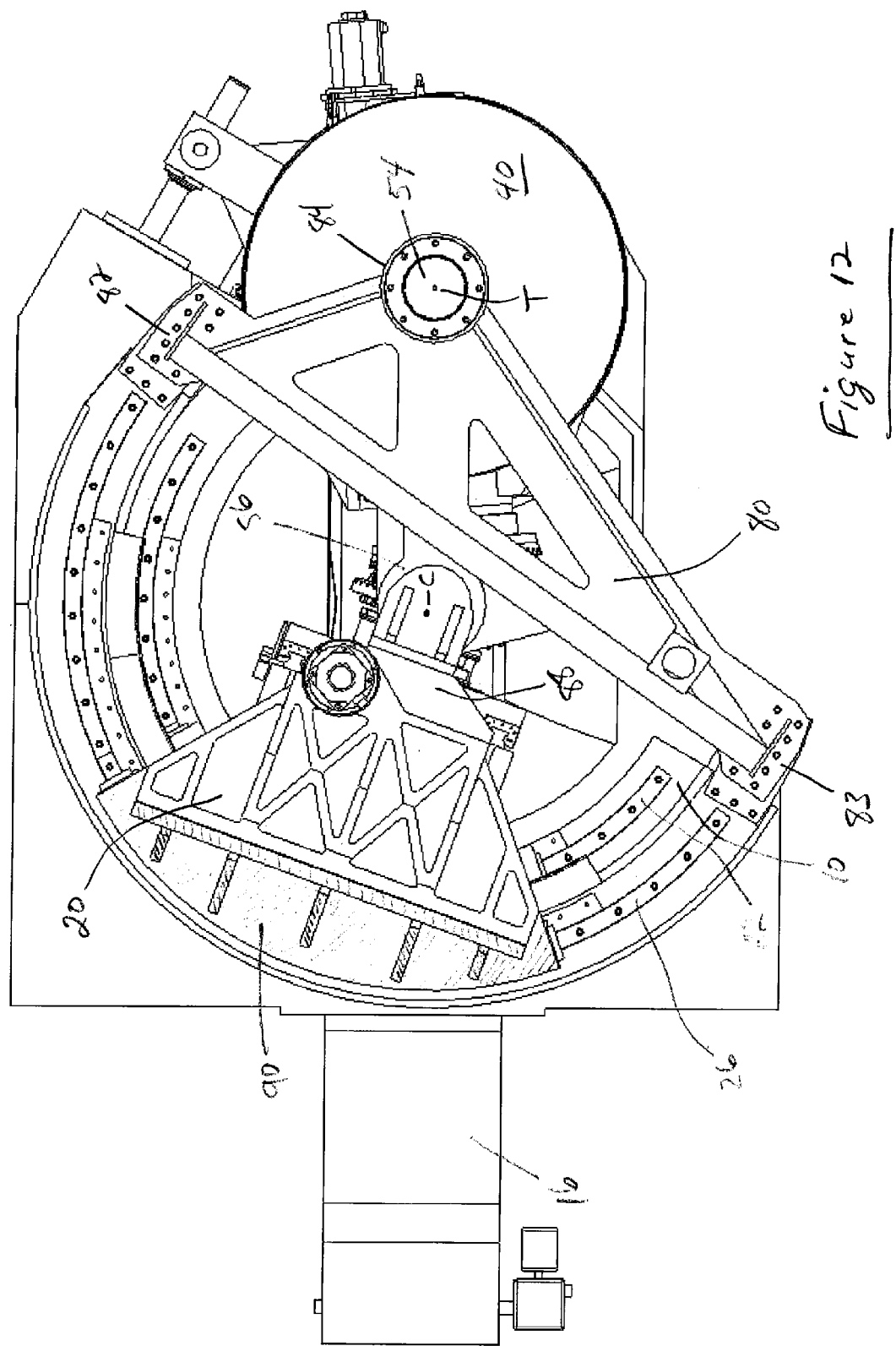
FIG. 12 is a top view of the machine of FIG. 11.

FIGS. 11-17 illustrate another (and preferred) embodiment of the invention. As best shown by FIGS. 11-14, the cover 50 of machine 2 (FIG. 4) has been removed and a bracing mechanism 80 installed. Bracing mechanism 80 (made of steel or iron, for example) comprises a generally triangular shape and includes ends 82, 83 that connect to wall 18, preferably connecting at the ends of wall 18, and a rotational connector 84 that connects to the turret 40 via bearing 54. Bracing mechanism 80 also includes a rotational connector 86 to which a column arm 88 extending from column 20 is rotatably connected via suitable bearings (not shown). Preferably, bracing mechanism 80 is constructed and positioned whereby pivot axis C passes through the connection point of rotational connector 86 and column arm 88. To enhance machine stability and simplify drive train design, spindle motor 34 (see FIG. 1) is positioned within carriage 30 as can be seen in FIGS. 11 and 15.

Additionally, column 20 may include an upper column connecting bracket 90 for attaching column 20 to guide way 26. Bracing mechanism 80 and upper column connecting bracket 90 provide additional support for column 20 resulting in enhanced mechanical stiffness of column 20. Bracing mechanism 80 also provides a physical connection between column 20 and turret 40 thereby further stabilizing the machine 2. If desired, the area between the upper vertically-extending surfaces of connecting bracket 90 and column 20 may accommodate shims of appropriate widths in order to precisely orient column 20 perpendicular to planar surface 10.

Figure 13:
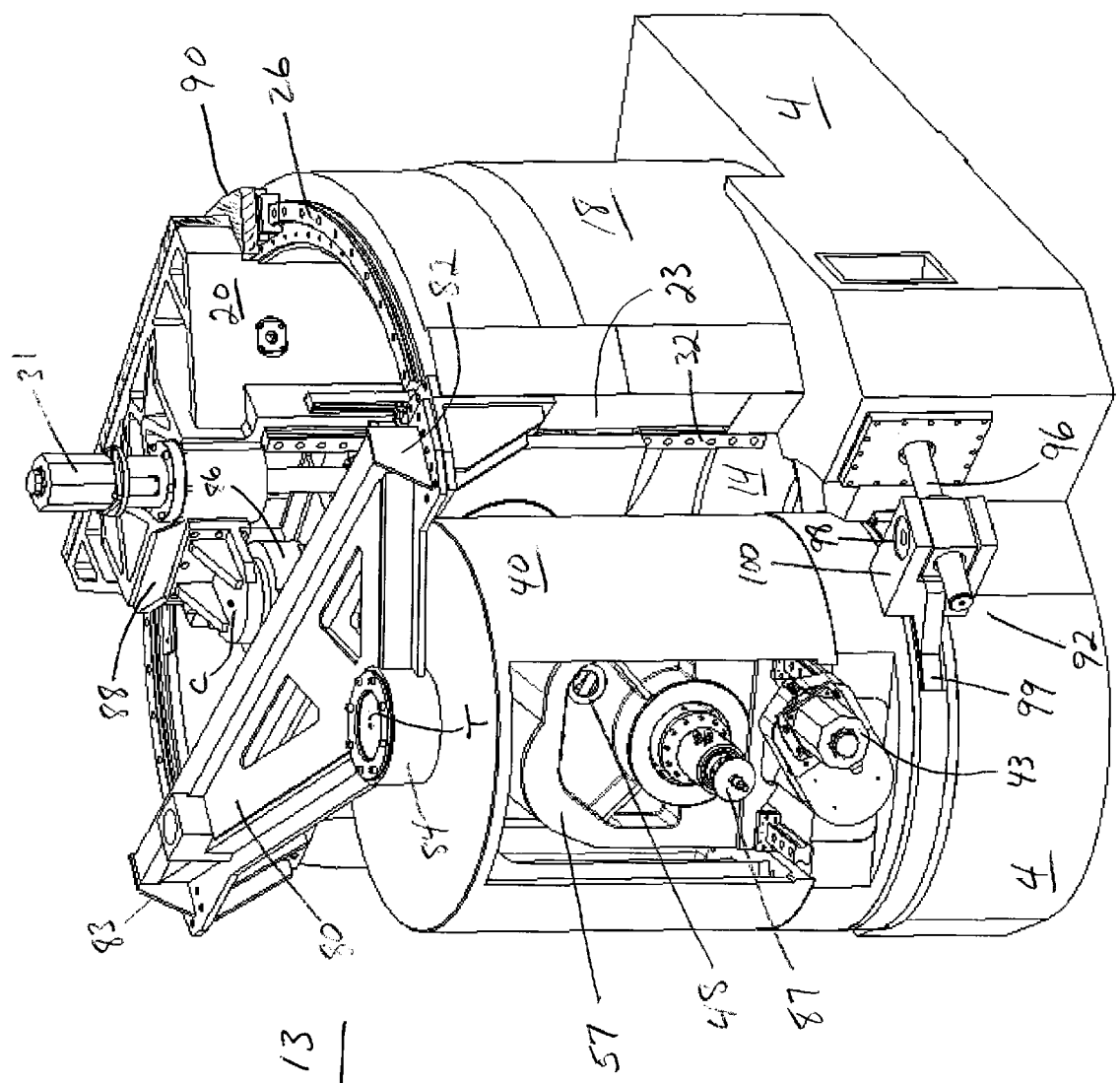
FIG. 13 shows a rotated view of the machine of FIG. 11 so as to view the rear portion of the workpiece spindle and carriage and a drive for the turret.
Figure 14:
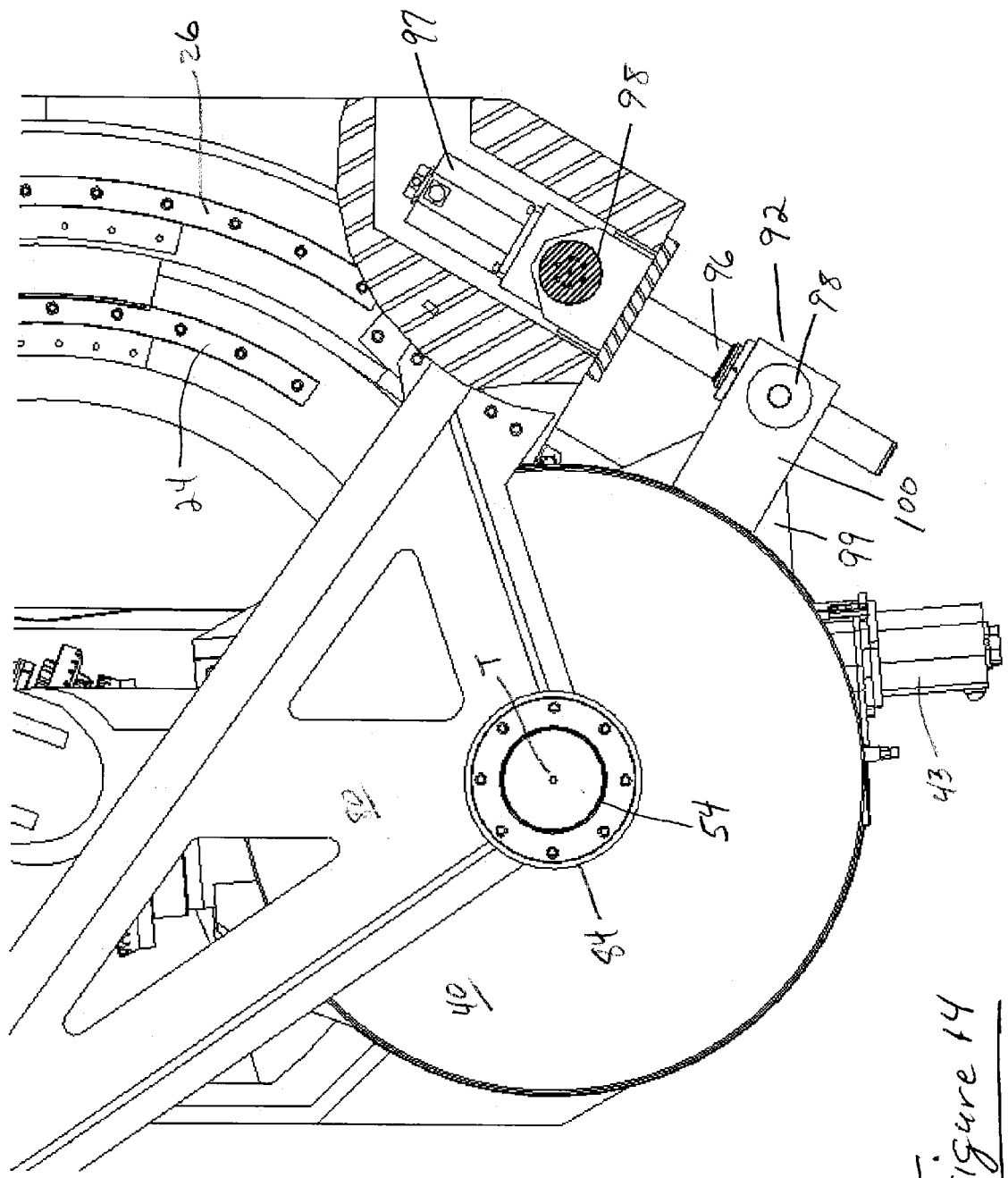
FIG. 14 is a partial top view of the machine of FIG. 11 showing the fine adjustment mechanism of the turret.

FIG. 13-15 illustrate a preferred hybrid drive and positioning mechanism for turret 40 comprising a fine adjustment mechanism 92 and a gross positioning mechanism 94. Fine adjustment mechanism 92 preferably includes a ball screw 96, servo motor 97 and pivoting connections 98 connected to a split collar clamp 99 via arm 100. Split collar clamp 99 extends about the lower end of turret 40 and preferably resides in a channel 101 formed in the peripheral region of turret 40. Split collar clamp 99 may be opened and closed via any suitable means such as a hydraulic piston (not shown), for example. With split collar clamp 99 in a closed position (i.e. turret 40 in a clamped condition), linear movement of ball screw 96 is capable of imparting incremental rotational adjustments of turret 40 in order to achieve fine rotational and stiffer positioning or motion of turret 40 such as, for example, in preparation for or during a machining operation.

As shown in FIG. 15, gross positioning mechanism 94 preferably comprises a direct drive motor having a rotor 102 and stator 104 for effecting a significant amount of rotation of turret 40 such as that which may be required for loading/unloading of workpieces or for maintenance. The direct drive motor is preferably positioned at a lower end of turret 40, most preferably at the lower end region of an axially-extending cylindrical-shaped projecting portion 106 of turret 40. Rotor 102 is located at the periphery of projecting portion 106 while the stator 104 is located on an inner circular surface of a turret base plate 108 that rests on planar surface 12. When a significant amount of turret rotation is required, the fine adjustment mechanism 92 is disengaged by opening the split collar clamp 99 followed by activating the direct drive motor 102/104 to rotate the turret 40 to a desired position. It should be noted that while turret base plate 108 is provided as a separate element in FIG. 15, this is done only for reasons of convenience. Turret base plate 108 may be manufactured integral with machine base 4.

Figure 4:
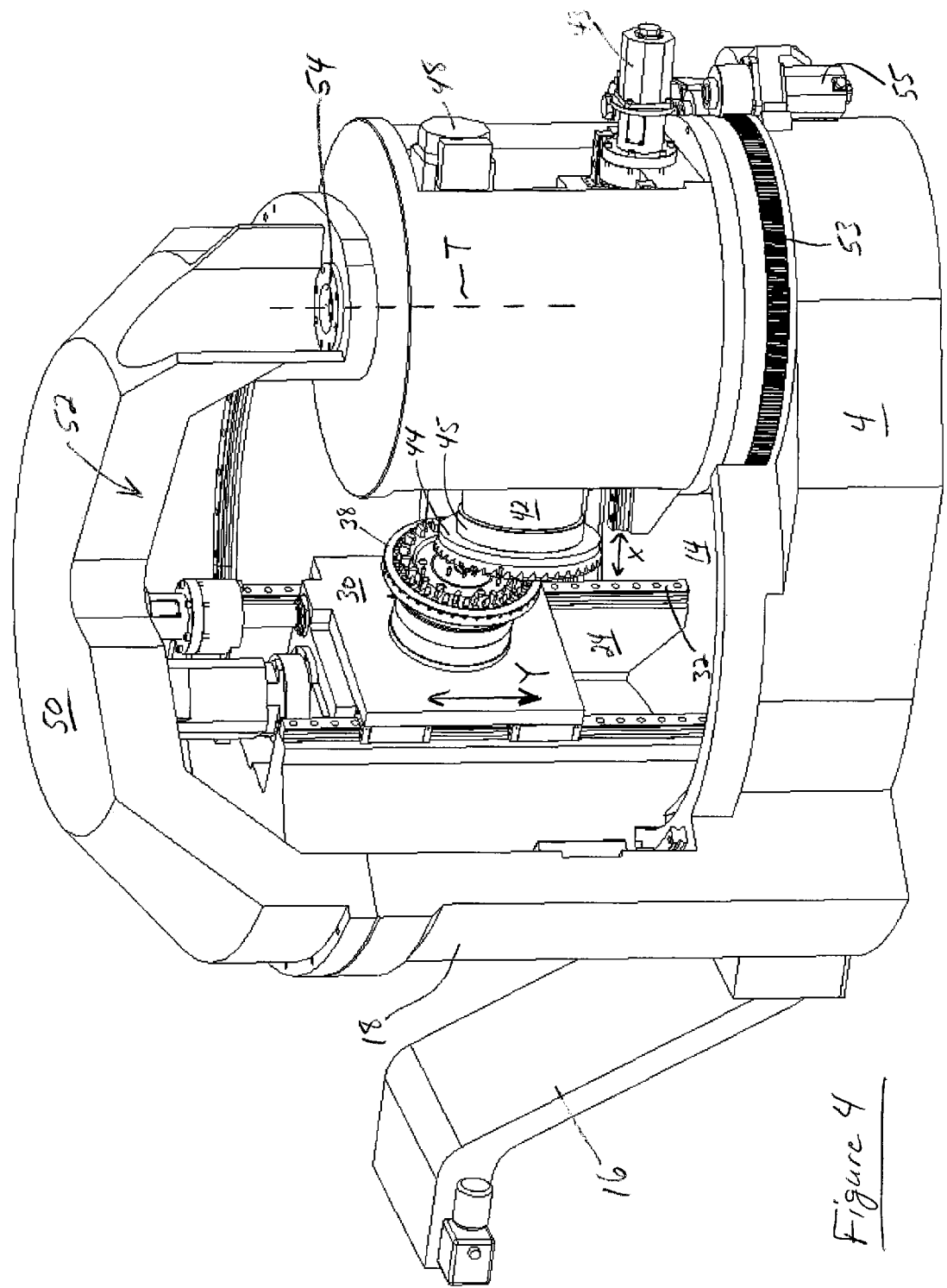
FIG. 4 illustrates the machine of FIG. 1 including a cover.

With respect to the hybrid drive and positioning mechanism for turret 40, the inventors have discovered that fine adjustment mechanism 92 and gross positioning mechanism 94 may be utilized together to dampen vibrations such as those which may be encountered due to process forces or the operation of the ball screw mechanism 96 when carrying out a fine adjustment of the rotational position of turret 40. While conducting the positioning adjustment with fine adjustment mechanism 92, the direct drive motor 102/104 of gross positioning mechanism 94 may be employed to selectively produce torque components designed to effectively dampen certain detected vibrations in the turret that may result from process forces or the operation of ball screw mechanism 96 thereby contributing to the further stabilization of turret 40. As a further measure to reduce dynamic machine deflections in the housing 57, slide 51 and turret 40, drive motor 48 for spindle 42 is preferably positioned within the spindle housing 57 (FIGS. 15-17) instead of projecting from the turret 40 as seen in FIG. 1 or 4. Such positioning places motor 48 within the region defined by the diameter of bearing 13 thereby enhancing the stability of turret 40.

Figure 16:
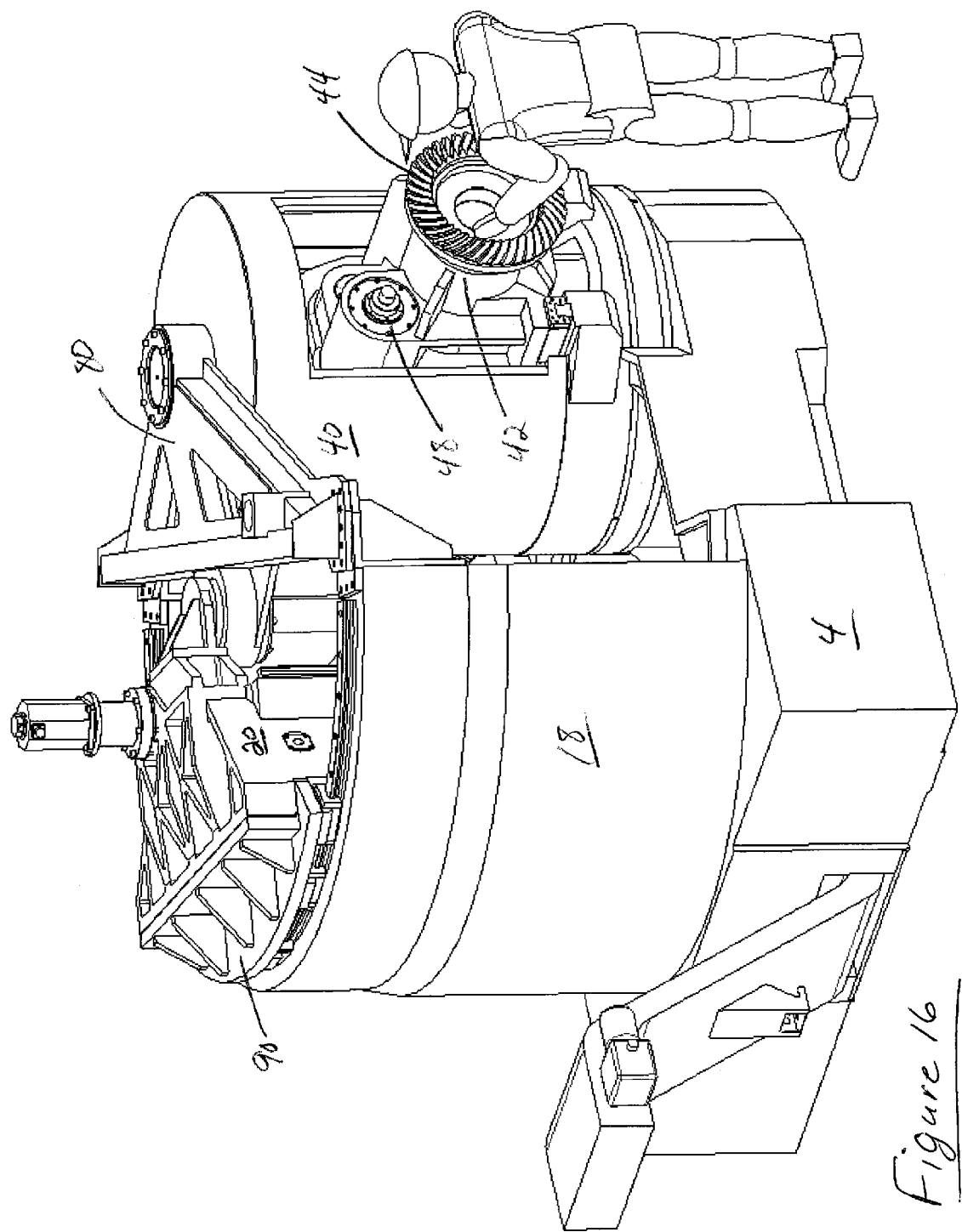
FIG. 16 shows the machine of FIG. 11 with the turret positioned for manual loading and/or unloading.
Figure 17:
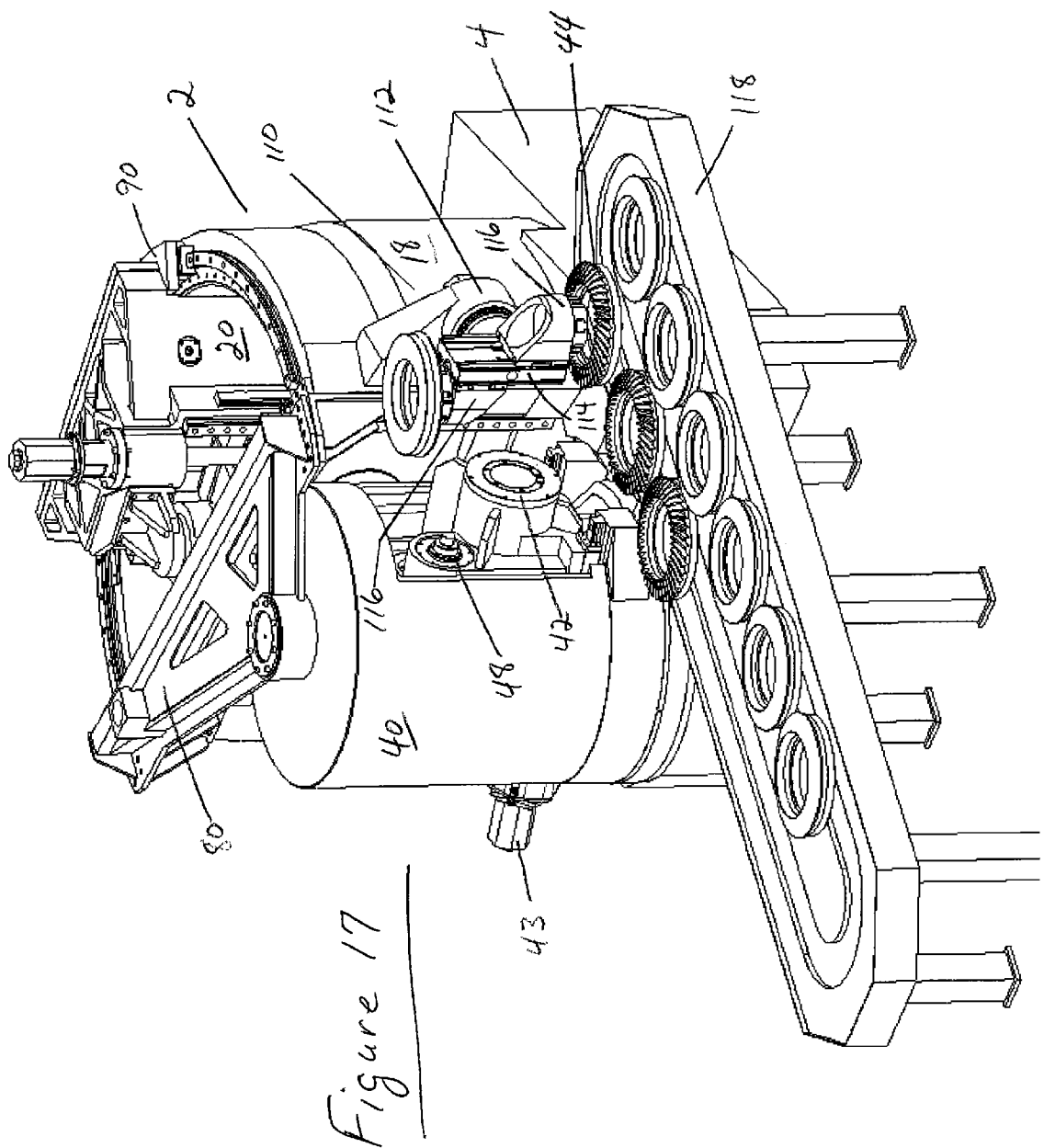
FIG. 17 shows the machine of FIG. 11 including an integrated loading/unloading mechanism.

While FIG. 10 illustrates a robot for loading and unloading of workpieces 44, the present invention (any embodiment) presents an suitable configuration for other types of loading and unloading. FIG. 16 shows manual loading/unloading of workpieces 44 where it can be seen that access to the workpiece spindle 42 is unobstructed thus making loading and/or unloading a simple task. Alternatively, FIG. 17 shows a loading mechanism 110 integrated with machine 2. Loading mechanism 110 comprises a motor 112 and a rotatable loader head 114 having a pair of workpiece grippers 116 that are linearly movable in a direction perpendicular to the axis of rotation of motor 112. Machined workpieces are alternately removed from spindle 42 with one gripper, for placement on a conveyor 118 (or other receptacle such as a pallet), and the other gripper picks-up an un-machined workpiece from conveyor 118 for placement onto spindle 42. Of course, the invention is not limited to the configuration or operational sequence of loading mechanism 110. Other types and configurations of loading/unloading mechanisms may be integrated with machine 2.

It should be mentioned that turret 40 may be positioned at other rotary locations for other operations to be carried out. For example, a different rotary position may be desired for chamfering and/or deburring. Still another position may be desired for stock dividing prior to a finishing process. Another position may be desired for measuring the workpiece. Presenting a workpiece for various operations is convenient as only rotation of the turret 40 is required. Turret 40 may also have additional openings to create additional access points to elements inside the turret or to provide passage to the machine chamber for any other operations housed within or on the turret such as, for example, tool loading and unloading or dressing units for grinding wheels.

With the inventive machine, in addition to positioning the turret 40 about axis T, the same computer-controlled axis T is used as a live machining axis. As such, only two linear directions of motion (X, Y), preferably perpendicular to one another, are necessary. A third linear direction of motion (commonly referred to as the "Z" direction or the "Z-axis" which usually extends perpendicular to the X and Y directions in a conventional mutually perpendicular machine axes configuration) is not needed to position the tool or workpiece spindles thus differentiating the inventive machine from many prior art machines. In other words, the inventive machine does not include additional means (e.g. motor, guide ways, etc.) to enable movement the workpiece spindle and tool spindle relative to one another linearly in a direction perpendicular to the X and Y directions (i.e. the "Z" direction).

Additionally, the nature of the combination of angular motions B (column 20) and P (turret 40) allows the machine 2 to deliver a total effective combined pivot travel (angle between spindle axes A and W) greater than the travel of a single pivot axis alone. This reduces the cost of the B motion elements and helps maintain a small machine footprint. Also, by supporting the arcuate motion B of column 20 with no mechanism or support underneath the area of cutting or grinding along its effective pivot centerline (C axis), less obstructed chip evacuation is realized.

While the invention has been discussed with reference to bevel gear cutting, the inventive machine is also suitable for other bevel and/or cylindrical gear processing methods including grinding, lapping, honing, skiving, measuring, testing and face coupling manufacture (such as CURVIC® couplings, a registered trademark of The Gleason Works). With respect to skiving, methods utilizing face-mill type cutters as well as those methods known as hob peeling or power skiving are contemplated on the inventive machine although skiving methods on the inventive machine are not limited to only those types. The inventive machine may also be utilized for metal working operations other than gear processing.

It is to be understood that with respect to operations where mating members of a gear set are run together or where one member of a gear set is run together with a master mating member, such as in the above-mentioned lapping or testing, one of the mating members would be positionable in second spindle 42 while the mating member would be positionable in first spindle 36.

While the invention has been described with reference to preferred embodiments it is to be understood that the invention is not limited to the particulars thereof. The present invention is intended to include modifications which would be apparent to those skilled in the art to which the subject matter without deviating from the spirit and scope of the appended claims.

What is claimed is:

1. A machine tool comprising:
   a machine base having a first side;
   a machine column movable along an arcuate path on said first side about a first pivot axis;
   a machine carriage movable in a first linear direction along said column;
   a first spindle positioned on said machine carriage, said first spindle being rotatable about a first axis of rotation;
   a machine turret located on said first side of said machine base, said machine turret being angularly movable about a second pivot axis;
   a second spindle positioned within said turret, said second spindle being rotatable about a second axis of rotation and said second spindle being movable in a second linear direction;
   wherein said first linear direction and said second linear direction are perpendicular to one another and wherein said first spindle and said second spindle are linearly movable relative to one another along one or both of said first and second linear directions;
   and wherein a third linear direction of motion of said first spindle and said second spindle relative to one another in a direction perpendicular to said first and second linear directions is not present on said machine.

2. The machine of claim 1 wherein said machine column is movable along an arcuate path on a first planar surface on said first side.

3. The machine of claim 2 wherein said first pivot axis is perpendicular to said first planar surface.

4. The machine of claim 1 wherein said first axis of rotation is perpendicular to said first linear direction.

5. The machine of claim 1 wherein said first pivot axis and said first linear direction are parallel to one another.

6. The machine of claim 1 wherein said second axis of rotation and said second linear direction are parallel to one another.

7. The machine of claim 1 wherein said first pivot and said second pivot axis are parallel to one another.

8. The machine of claim 1 wherein said turret is angularly movable on a second planar surface on said first side.

9. The machine of claim 8 wherein said second pivot axis is perpendicular to said second planar surface.

10. The machine of claim 1 further comprising a first planar surface on said first side and a second planar surface on said first side, said first planar surface and said second planar surface being one of parallel with one another or coplanar with one another.

11. The machine of claim 1 further comprising a columnar wall portion located on said first side and having a curved shape extending between a pair of end faces, said wall portion being located outward of said column.

12. The machine of claim 11 wherein said curved shape is arcuate having a geometric center, and wherein said first pivot axis extends through said geometric center.

13. The machine of claim 11 further comprising a bracing mechanism extending between said turret, said wall portion and said column.

14. The machine of claim 13 wherein said bracing mechanism is attached to said wall portion proximate each of said pair of end faces.

15. The machine of claim 13 wherein said bracing mechanism is attached to said turret and said column via a respective bearing connection.

16. The machine of claim 13 wherein said column is movable along said arcuate path via an additional guide way located along said end surface of said wall portion.

17. The machine of claim 16 wherein said column is in communication with said guide way via a connecting bracket.

18. The machine of claim 1 wherein said turret includes a drive system comprising a fine adjustment mechanism and a gross positioning mechanism, said fine adjustment mechanism and said gross positioning mechanism being operable independently of one another or in conjunction with one another.

19. The machine of claim 18 wherein said fine adjustment mechanism includes a split collar clamp arranged about said turret.

20. The machine of claim 18 wherein said gross adjustment mechanism comprises a direct drive motor.

21. The machine of claim 1 further including an integrated workpiece loading and unloading mechanism.

22. The machine of claim 1 wherein said turret is generally cylindrical in shape and includes an outer peripheral surface with at least two locations on said peripheral surface for accessing the interior of said turret.

23. A method of machining bevel and hypoid gears on a machine including a column, a tool spindle movably secured to said column, a machine turret and a workpiece spindle movably secured to said machine turret, said method comprising:
   mounting a tool on said tool spindle;
   mounting a workpiece on said workpiece spindle;
   rotating said tool around a tool axis;
   rotating said workpiece around a workpiece axis;
   moving said tool spindle in a vertical direction;
   moving said workpiece spindle in a horizontal direction;
   pivoting at least one of said tool spindle about a first pivot axis via arcuate movement of said column and said workpiece spindle about a second pivot axis via angular movement of said turret;

engaging said tool with said workpiece to machine a tooth slot in said workpiece.

24. The method of claim 23 wherein engaging said tool and said workpiece includes machining all tooth slots in said workpiece without disengaging said tool from said workpiece.

* * * * *